ENDLESS TRACK MOTION PICTURE RECORDING APPARATUS

Filed Aug. 23, 1965 2 Sheets-Sheet 1

INVENTOR.
Jerome H. Lemelson

INVENTOR.
Jerome H. Lemelson

United States Patent Office 3,537,781
Patented Nov. 3, 1970

3,537,781

ENDLESS TRACK MOTION PICTURE RECORDING APPARATUS

Jerome H. Lemelson, 85 Rector St., Metuchen, N.J. 08841

Filed Aug. 23, 1965, Ser. No. 481,812
Int. Cl. G03b 41/00
U.S. Cl. 352—83 2 Claims

ABSTRACT OF THE DISCLOSURE

Apparatus for recording plural parallel sound tracks on an endless motion picture film. A plurality of sound heads are positioned laterally across the sound record portion of the film. One sound track has cue signals which activate the appropriate sound head for recording as the endless film moves through the apparatus.

More particularly, this invention relates to a magnetic recording apparatus employing an endless recording tape having a plurality of parallel record tracks and a plurality of transducers with at least one transducer operative to record and/or reproduce signals with respect to a selected one of said tracks.

It is known in the art to provide a magnetic recording apparatus with a record medium in the form of a flexible magnetic tape provided as an endless loop thereof and wound in a cartridge which may easily be removably coupled to the recorder which contains means for driving the tape past transducing means. Such apparatus has been described in such patents as U.S. Pats. 2,778,636, 2,850,278 and 2,837,332 and has been limited in its application by the time duration required to drive the tape past a single transducer. In other words, prior art devices employing closed loop magnetic tapes have heretofore operated by recording on and reproducing from a single channel of the tape. While endless tape recording devices have been proposed which employ a recording channel which spirally extends longitudinally around the tape with the continuation of the channel on similar portions of the tape being laterally displaced from other portions of the channel, the mechanism required to laterally displace the single transducer operative for reading or recording on said single channel and to retain same tracking or aligned with said single track as the tape is driven, such mechanisms are relatively complex as they require synchronization of the lateral movement of the transducer with the tape movement and a vernier drive for the transducer. The mechanism generally is limited in application to the use of relatively short tapes and is not capable of easily performing various functions such as continuous, repeat playback or selective playback of recordings on the tape.

Accordingly it is a primary object of this invention to provide a new and improved recording and reproduction apparatus. Another object is to provide an improved magnetic recording apparatus employing a magnetic tape wound as an endless loop in a cartridge which is capable of being easily and rapidly replaced on the recorder by a similar cartridge and having a substantially greater recording and playback capacity than conventional magnetic recording apparatus employing endless recording tape of similar length.

Another object is to provide a recording and reproduction apparatus employing a magnetic tape recording medium which may be operated without the necessity of reversing the drive of said tape to record or reproduce therefrom continuously during a plurality of passes of the tape past transducing means.

Another object is to provide a recording apparatus employing an endless flexible tape as a record medium having a plurality of record tracks and means for selectively reproducting from said tracks as well as automatically reproducing therefrom in a manner to permit the automatic reproduction of a continuous recording extending from one track to the next.

Another object is to provide a new and improved method of automatic tape recording and reproduction with respect to a plurality of channels of an endless recording medium.

Another object is to provide new and improved recording arrangements operative to effect both automatic recording and reproduction with respect to an endless recording medium.

With the above and such other objects in view as may hereafter more fully appear, the invention consists of the novel constructions, combinations and arrangements of parts as will be more fully described and illustrated in the accompanying drawings, but it is to be understood that changes, variations and modifications may be resorted to which fall within the scope of the invention as claimed.

Figure 1:
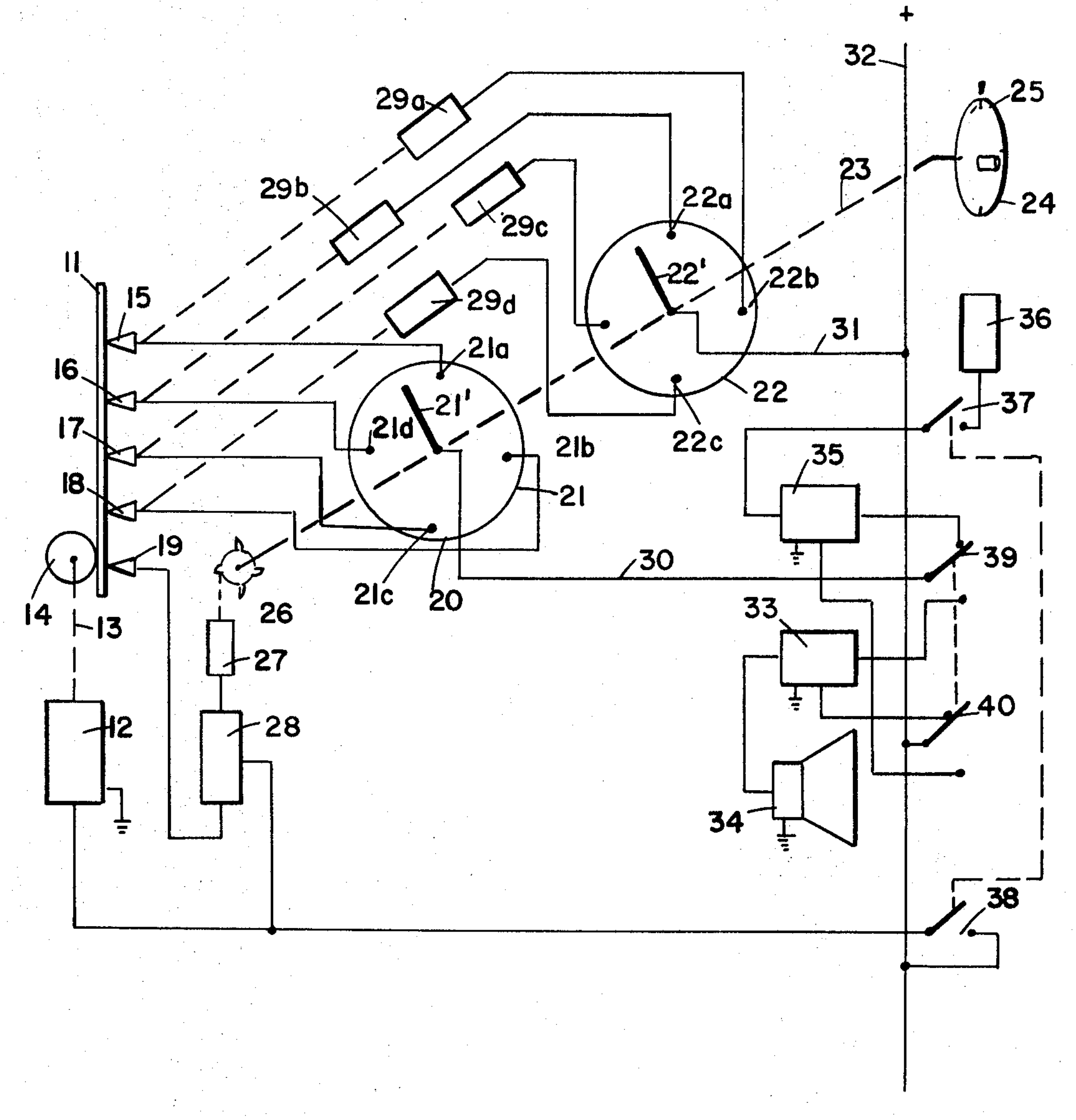
FIG. 1 is a schematic diagram of a magnetic recording and reproduction apparatus and control means therefore defining the current invention.

Referring to FIG. 1, a magnetic recording apparatus 10 is shown having a magnetic tape 11 moveable on a tape transport (not shown) which is driven by a constant speed motor 12 and conventional drive means including an output shaft 13 and frictional drive wheel 14 operatively coupled to the tape 11. The tape 11 is shown in lateral cross section and preferably comprises a closed loop configuration of magnetic recording tape wound in the form of a coil in a housing or magazine and unwindable as it is driven in said path from the center of said coil past a plurality of transducers 15–18 and back again on to the outside of said coil as illustrated in my said copending application Ser. No. 311,252.

The multiple magnetic transducers or heads 15–19 preferably each ride against a different channel or track of the tape 11 and are preferably operative to record and/or reproduce from their respective channels. The heads 15–18 may be laterally aligned to engage a particular longitudinal portion of the tape 11 or may be staggered for the purposes described hereafter. The magnetic head 19 is coupled to reproduce a pulse signal recorded on its channel, which signal is indicative of a particular point or longitudinal coordinate along the tape which defines where recordings on each channel terminate and start. Assuming, for example, that a particular recording is initiated on the track scanned by magnetic head 15 at a point or portion of the tape which is scanned thereby just after a pulse signal recorded on the track scanned by magnetic reproduction transducer 19 is reproduced thereby. Recording may thereafter be effected until the closed loop configuration of said tape has substantially completely passed the head 15 after which the recording may be continued on the adjacent track scanned by head 16. Since the track scanned by 15 has been completely recorded on, the continuation of recording thereon will only obliterate the previous recording therefrom. Accordingly, during the recording function, the recording signal is switched by means to be described from the input to the magnetic recording head 15 to the input of magnetic recording head 16 when head 15 has completely scanned and recorded on its channel. Switching from one channel to the next is automatically effected when the reproduction head 19 is energized by the recording of a pulse on its channel which pulse indicates the location of the tape at which to effect said channel switching.

A double deck rotary stepping switch 20 is provided to effect a number of switching functions for continuous or selective reproduction and/or recording of signals. The shaft 23 of the stepping switch 20 rotates a switching position to rotate the wiper arms 21' and 22' of the two decks 21 and 22 of the switch each time it is stepped by means of a solenoid 27 which is activated by the pulse reproduced by head 19 after being amplified in reproduction amplifier 28 connected thereto. Thus, each time the pulse recording indicating the same section of tape is reproduced by head 19, both decks 21 and 22 of the stepping switch are stepped to a new output position for performing the functions described hereafter.

The input 30 to deck 21 of switch 20 is connectable to either a recording amplifier 35 or a reproduction amplifier 33 through a manual bi-stable switch 39 for performing either the recording or reproduction function. A microphone 36 is connected through a push button switch 37 to the recording amplifier 35 for recording audio signals on one or more of the channels of the tape depending on the duration of said signals and the switching performed by operation of the stepping switch. Actuating switch 39 to the other position connects line 30 to a reproduction amplifier 33 which is connected to a loud speaker 34 for transducing signals recorded on the tape to sound. The double pole switch which includes switch arm 39 also contains an arm 40 operative to connect power line 32 to either of the amplifiers 33 and 35. The center neutral position of switch 40 is operative to disconnect both amplifiers from said power supply. Either or both the switching circuits defined by switch arms 39 and 40 may also be operative to connect the proper windings of the pole pieces of transducers 15–18 for performing either the reproduction or recording functions. Also, the two illustrated amplifiers 33 and 35 may comprise a single amplifier adapted to perform both recording and reproduction amplification of the signals passed therethrough.

Shaft 23 of the stepping switch 20 may be actuated by a ratchet-pawl mechanism 26 which is coupled to the shaft of the solenoid 27 and is adapted so that shaft 23 may also be manually rotatable by a turn knob 24 provided on an indicator mount 25 accessible to the operator adjacent switches 37–40 so that the operator may also selectively position the stepping switch for selective recording and/or reproduction of signals relative to a selected channel. The mount 25 therefore preferably contains a pointer 24' coupled to knob 24 and indicating marks 25'' on the face of 25 to indicate to the operator which channel of the tape is operatively coupled to a transducer and circuit 30 for recording and/or reproducing relative thereto.

The function of the multiple transducers and means for automatically switching from one channel to the next is to permit a recording to be made on the tape of the duration of which may be extended a multiple of the time it takes for the tape to be driven in a single pass of the transducers. In other words, if ¼" wide magnetic tape is employed, and four transducers 15–18 are utilized each scanning a different track of the tape, the tape may be driven four times in its closed circuit past the transducers before it is entirely recorded on or reproduced from. If both sides of the tape are utilized for recording and reproduction functions and the channels thereof are either aligned with or staggered relative to those on the opposite side, then the tape may be driven and recorded on during at least nine passes of the transducers to completely record thereon since only one channel, that scanned by head 19 on one side of the tape, will be needed for effecting switching from one channel to the next.

While all magnetic transducers may be positioned to simultaneously engage the tape during recording and/or reproduction functions, since only one transducer is energized at a time with the exception of head 19, such engagement may cause substantial wear on both heads and tape during extended operation of the apparatus. Accordingly, means are provided in FIG. 1 for effecting the engagement of only that transducer which is electrically energized at the time with its channel of the tape while retaining the remainder of the transducers, with the exception of head 19, retracted a short distance off the tape. In FIG. 1 each of the transducers 15–18 is moveable from a retracted position relative to the tape to a position in engagement therewith by means of a respective mechanism including a solenoid. Head 15, for example, is advanced into engagement with and retracted from its channel of tape 11 by means of solenoid mechanism *29a*. Notations *29b–29d* refer to solenoid actuated mechanisms for advancing and retracting respective of the heads 16–18. The solenoid mechanisms are energized to advance their respective heads by a signal gated thereto through the switch deck 22 from power supply 32. Thus that solenoid which is associated with the head connected to line 30 through deck 21 is energized to advance its head and, when deenergized after the wiper arm 22' of deck 22 has been stepped to the next position, the mechanism is operative to retract its head.

Notation 38 refers to a switch connecting power supply 32 with both the tape drive motor 12 and the reproduction amplifier 28 for head 19. Switch 38 may be operated to close and open by means of a common actuator 41 connecting it with the arm of switch 37.

Various modifications to the apparatus hereinbefore described are possible and include the following changes and additioned thereto:

(I) The signal operative to switch from one recording channel to the next when the location of the end of recording approaches the transducers may be generated in a number of manners other than that described. For example, a hole or notch in the recording film or tape may be mechanically scanned and used to activate an electromechanical switch. A mark or hole locating said end-of recording location may also be provided together with a photoelectric cell positioned on the recorder to scan same and provide a pulse with each scanning thereof for activating the described stepping switch means. Also, a tone signal above the audio range may be magnetically recorded on each of the audio recording channels at the end-of-recording locations and a tone relay coupled to the output side of the stepping switch may be responsive to the reproduction of said tone signals and operative when energized thereby to activate the stepping motor or solenoid activating the stepping switch described.

(II) Recordings other than or in addition to an extended audio signal may be recorded on all or selected of the channels of the endless tape for reproduction continuously as described as the tape recycles past the heads. For example, video picture signals as motion pictures or document recordings, bit-codes, analog signals derived from instrument outputs or other forms of document or graphic recordings may be so recorded to be continuously scanned and continuously reproduced as the recording member recycles past the scanning means therefore.

(III) In another embodiment employing a single recording and/or reproduction transducer for the information recorded on the plural tracks or channels, the single transducer or the recording member may be shifted in response to the end-of-channel recording signal to bring the next channel containing the continuation of the previously scanned recording into operative alignment with the scanning transducer. Motor or solenoid operated head and/or tape transport or cartridge stepping means may be operative each time said locating signal is reproduced by control means responsive to the reproduced signal to shift the recording member or scanning transducer to align the next channel and transducer to continue recording or reproduction.

(IV) A mechanism operative in response to the reproduced scanning signal and driven by a single servo may replace the plural solenoids described to sequentially bring each magnetic head to engage its tract of the tape and disengage same. Said mechanism may be coupled to the shaft of the described channel stepping switch 21 or the means driving same for selectively coupling and uncoupling the heads from the tape as described.

(V) All heads may be mounted on a common base as a bank thereof and the base mounted to predeterminedly position all heads just off the magnetic tape but close enough to effect recording and/or reproduction functions without touching said tape. Or the common mount for the bank of heads may include means for ejecting air between the heads and tape in a manner to float same thereoff and maintain a predetermined gap separating said heads from said tape but permitting recording and/or reproduction functions.

(VI) In still another embodiment, the flexible recording tape may comprise filmstrip containing plural rows of tandem frames of motion picture or document images adapted to be consecutively scanned or projected. In a preferred form of such apparatus, a motion picture may be recorded with a first portion thereof extending along a first channel of the filmstrip, then continuing as a second portion along a second channel of the same endless loop of filmstrip, then continuing as a third portion along a third channel thereof and so forth. Means are provided for shifting the magazine or transport for the endless filmstrip laterally with respect to the optical projection system a degree each time each portion of the motion picture plays out as indicated by a mark, cutout or other recording along the border of the filmstrip locating the end of each portion of the motion picture recording and the beginning of the next portion of recording. A solenoid or electric motor activated each time a device such as a switch or relay sensing said mark, is utilized to actuate the mechanism laterally stepping or moving the magazine a degree each time it is so activated to position the next record track centered in the field of the optical projection system. The entire action preferably occurs at a speed such that the human eye will not be able to discern lateral movement of the film or interruption in its movement. In other words, such lateral shifting of the film is preferably accomplished during a blanking interval when the shutter is in the path of the projection system.

It is noted that certain of the features hereinbefore described for the continuous playback or reproduction of signals recorded on different channels of a magnetic recording member may be modified to provide a different embodiment of the invention which may also be further modified and applied to the continuous recording and playback of visual phenomena such as motion picture(s) which are projectable from film in the form of a strip containing a plurality of tracks 51 of image frames F extending parallel to each other along the length of the filmstrip.

Figures 2, 3:
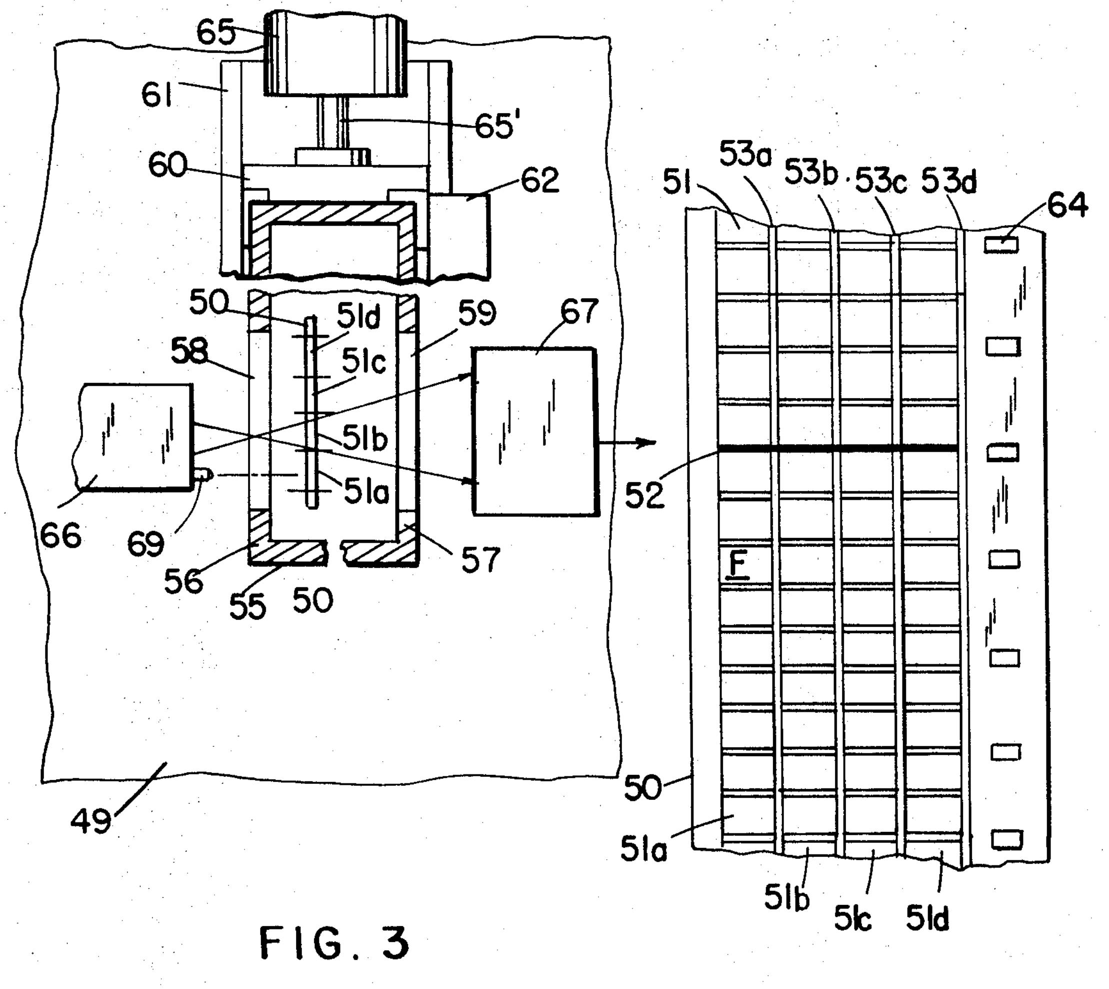
FIG. 2 is an end view with parts broken away for clarity of a portion of an endless filmstrip projection apparatus embodying features of the invention, the filmstrip being shown in lateral cross section.
FIG. 3 is a partial plan view of an optical projection apparatus for filmstrip of the type shown in FIG. 2 and embodying principles of the invention illustrated in FIG. 1.

FIG. 2 shows a recording arrangement on an endless strip 50 of photographic or other suitable film capable of retaining projectable phenomena wherein light is passed through or reflected off the film. Four recording channels **51*a*, 51*b*, 551*c* and 51*d* are shown extending parallel to each other longitudinally along the length of the filmstrip 50, each of which channels contains a motion picture recording in the form of plural image frames which recordings each initiate and end at substantially the same longitudinal location of the filmstrip defined in FIG. 2 by lateral line or band 52. The motion picture recording may start, for example, on track 51*a* at or near locating line 52 and continue substantially completely along said track until the end of said track has been reached after which the same motion picture phenomenon may continue on track 51*b* and extend completely therealong until the end portion thereof defined by location 52 whereafter the recording may continue on track portion 51*c* and so on. Notations, 53*a*, 53*b*, 53*c* and 53*d* refer to tracks containing audio recordings adjacent each of the picture recording tracks 51. Notaion 64 refers to sprocket drive holes in the border portion of the filmstrip 50**.

To permit continuous projection of the motion picture recording, either the filmstrip 50 is automatically shifted with respect to the projection apparatus when the end of a one track has been reached or the optical projection system therefore is moved at such a speed permitting the continuous projection of motion picture and audio phenomena without apparent interruption. FIG. 3 illustrates means for effecting the lateral shifting of the filmstrip with respect to optical projection apparatus. In FIG. 3 the filmstrip 50 is shown supported in a magazine 55 of any suitable design and longitudinally movable past a pair of aligned windows or openings 58 and 59 in opposite walls 56 and 57 of the magazine 55. The windows 58 and 59 preferably extend the width of the filmstrip and are at least one frame length in height permitting all channels of the film to receive and pass projection light through the magazine or cartridge 55.

The projection system includes a suitable light source and first optical sub-system located in a first housing 66 disposed on one side of the cartridge 55 and a second optical sub-system in a housing 67 operative to receive light after it has passed through a selected channel of the film in the cartridge 55 for projecting said modulated light as an image on a screen. Housing 67 may also contain direct viewing means, a television camera operative to scan the modulated light for the remote transmission of same as video signals, a photographic camera or other suitable means for producing hard copy of selected frames of information recorded in cartridge 55.

In a preferred embodiment of the invention, the cartridge 55 is removably mounted on the projection apparatus housing or frame 49 and is movable in a path parallel to the surface of the portion of film 50 being scanned in a manner to present the different recording channels thereof centered in the field of the optical projection or scanning system. Cartridge 55 is shown mounted on a base 60 in the form of a carriage which is slidably or otherwise movable along a track 61 supported by the frame 49 of the projection apparatus. A powered drive means in the form of one or more electric motors for driving the filmstrip 50 is located in a housing 62 supported by carriage 60, has an output shaft and coupling means (not shown) for removably coupling said drive means to means supported by the cartridge 55 for longitudinally driving the filmstrip during scanning.

Means for moving the carriage 60 to index different channels of the filmstrip and center in the scanning field including a lineal servo 65 mounted fixed on the frame or base 49 having an output shaft 65' and indexing means (not shown) for lineally moving shaft 66 and the carriage 60 coupled thereto the proper degree each time 65 is energized by a pulse generated when locating mark or band 52 on the filmstrip is scanned, to center the next channel of the filmstrip in the optical field of the projection system. The action preferably occurs in less time than it takes to operate the shutter between picture frames during projection.

Scanning the end-of-track band 52 to generate a pulse for effecting lateral shifting of the cartridge and filmstrip therein is effected by a photoelectric cell 68 supported by the housing 49 mounting the optical projecting system. Accordingly, the photoelectric cell is energized only by light transmitted thereto from the marker band 52 which may comprise reflex reflecting material or metallized plastic adapted to reflect a beam of light generated by a light source 69 disposed adjacent the housing of photoelectric cell 68, back to the photoelectric cell to activate same.

It is noted that the housing 67 preferably also contains photoelectric means adapted to receive the image of the sound track 53 adjacent the picture frames of the channel being scanned to provide an audio signal for producing sound accompanying the motion picture being projected. Thus the recording on each sound track will be reproduced simultaneously with the projection of its associated images.

I claim:

1. A record transducing apparatus comprising in combination:

a base for supporting said apparatus, transport means for an endless flexible motion picture film having a plurality of endless record tracks containing recordings of different lengths of the same motion picture recording with the termination of the recording on one track being substantially adjacent to the continuation of said recording on an adjacent track of said film and progressing in the same direction, means for transducing said motion picture recordings from a single track of said film at a time, said transducing means being supported by said base, means for driving said motion picture film of said transport means continuously past said transducing means a plurality of times whereby said transducing means may scan the recordings first on one track and then on another, means for relatively moving said transport means and said transducing means to operatively locate said transducing means for selectively scanning each of the tracks of said film, servo means for shifting the relative location of said transducing means and said transport means, control means for said servo means operative to cause the shifting of said relative position of said transducing means and said transport means to step the relative location of said transducing means and said film so as to shift the transducing operation from one track to the next track thereto, a control recording provided on said film, means for scanning said control recording and generating an electrical control signal upon sensing said recording, said control means for said servo means being operatively connected to said scanning means, said servo means being operatively connected to said scanning means, and said servo means being operative upon energization by a control signal received from said scanning means to shift the relative position of said transducing means and said transport means transverse to the direction of the film travel while the drive of said film is continued in the same direction whereby continuation of the scanning of the motion picture terminating on one track will be effected by scanning the adjacent track without an apparent interruption in the motion picture generated by said transducing means.

2. An apparatus in accordance with claim 1, said flexible film having a plurality of additional tracks each containing an audio recording associated with respective of the tracks containing motion pictures, transducing means for said audio tracks fixedly supported with respect to the transducing means for scanning the motion picture tracks whereby when the relative position of the transducing means and the film transport means is shifted, the audio recording along the terminal portions of one track will be continued to be reproduced from another audio recording track without the apparent interruption thereof.

References Cited

UNITED STATES PATENTS

| | | | |
|---|---|---|---|
| 1,455,766 | 5/1923 | Portass | 352—83 |
| 2,109,627 | 3/1938 | Finch | 179—100.2 |
| 2,328,539 | 9/1943 | Greenleaf et al. | 179—100.2 |
| 3,048,083 | 8/1962 | Rosenbaum | 179—100.2 |
| 3,287,830 | 11/1966 | Fleury et al. | 179—100.2 |
| 2,670,212 | 2/1954 | Heller et al. | 179—100.2 |
| 3,248,164 | 4/1966 | Wells. | |

NORTON ANSHER, Primary Examiner

M. H. HAYES, Assistant Examiner

U.S. Cl. X.R.

352—27, 37